(12) United States Patent
Calnek

(10) Patent No.: US 7,789,433 B2
(45) Date of Patent: Sep. 7, 2010

(54) TUBE NUT ASSEMBLY

(75) Inventor: Scott Calnek, Whitby (CA)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/341,298

(22) Filed: Dec. 22, 2008

(65) Prior Publication Data
US 2010/0156098 A1 Jun. 24, 2010

(51) Int. Cl.
F16L 25/00 (2006.01)
(52) U.S. Cl. .................. 285/334.5; 285/353; 285/385
(58) Field of Classification Search .......... 285/334.1, 285/334.4, 334.5, 353, 384, 385
See application file for complete search history.

(56) References Cited

U.S. PATENT DOCUMENTS

| | | | | |
|---|---|---|---|---|
| 2,497,273 A * | 2/1950 | Richardson | ............. | 285/334.5 |
| 2,497,274 A * | 2/1950 | Richardson | ............. | 285/3 |
| 2,534,199 A * | 12/1950 | Guarnaschelli | ............. | 285/334.5 |
| 2,544,109 A * | 3/1951 | Richardson | ............. | 285/3 |
| 3,024,047 A * | 3/1962 | Schmohl | ............. | 285/332.2 |
| 3,040,288 A * | 6/1962 | Edlen et al. | ............. | 439/452 |
| 3,273,918 A * | 9/1966 | Legarra et al. | ............. | 285/332.3 |
| 3,294,426 A * | 12/1966 | Lyon | ............. | 285/334.5 |
| 3,332,708 A | 7/1967 | Jackson et al. | | |
| 4,602,809 A * | 7/1986 | Ross et al. | ............. | 285/50 |
| 4,645,245 A | 2/1987 | Cunningham | | |
| 5,288,113 A * | 2/1994 | Silvis et al. | ............. | 285/342 |
| 6,056,331 A * | 5/2000 | Benett et al. | ............. | 285/343 |
| 6,109,660 A * | 8/2000 | Akiyama et al. | ............. | 285/45 |
| 6,601,879 B2 * | 8/2003 | Donoho et al. | ............. | 285/334.5 |
| 6,729,659 B2 * | 5/2004 | Schroeder et al. | ............. | 285/334.5 |
| 2003/0047945 A1 * | 3/2003 | Schroeder et al. | ............. | 285/334.5 |
| 2005/0087984 A1 * | 4/2005 | Weick et al. | ............. | 285/334.2 |
| 2005/0134043 A1 * | 6/2005 | Staniszewski et al. | ............. | 285/334.5 |
| 2007/0194567 A1 | 8/2007 | Pliassounov | | |
| 2007/0236016 A1 * | 10/2007 | Kloss et al. | ............. | 285/353 |

* cited by examiner

Primary Examiner—James M Hewitt
(74) Attorney, Agent, or Firm—Quinn Law Group, PLLC

(57) ABSTRACT

A tube nut includes a first member and a second member. The first member is threaded and defines a first hole. The second member is selectively rotatable with respect to the first member and defines a second hole. A tube or pipe extends through the first and second holes. The rotation of the first member in a threaded hole causes an axial load on the second member and the tube to urge the tube against a seat to provide a seal between the tube and a fluid passage. Relative rotation between the first and second members reduces or eliminates torsional strain on the tube.

5 Claims, 1 Drawing Sheet

TUBE NUT ASSEMBLY

TECHNICAL FIELD

This invention relates to tube nut assemblies for connecting fluid passageways.

BACKGROUND OF THE INVENTION

Fluid couplings are configured to provide fluid communication between two fluid passages. Some fluid coupling configurations include a nut and a body. Such fluid coupling configurations are often used in automotive brake line applications, and include those defined by SAE J533 and JASO F402 standards. The body defines a threaded bore. At the terminal end of the bore, a first fluid passage terminates at a protuberant seat. The nut includes threads that are engageable with the threads of the bore so that rotation of the nut inside the bore causes axial movement of the nut. The nut also defines a hole that extends therethrough.

A tube defines a second fluid passage and extends through the hole of the nut. The tube is positioned with respect to the nut such that, as torque is applied to the nut, the nut applies an axial load to the tube, which urges the end of the tube into contact with the seat, thereby establishing fluid communication between the first and second fluid passageways. The nut also transfers some of the torque to the tube.

SUMMARY OF THE INVENTION

A tube nut assembly includes a tube nut having a first member and a second member. The first member has a threaded shank, and defines a first hole that extends through the threaded shank. The second member defines a second hole and is selectively rotatable with respect to the first member. A tube extends through the first hole and the second hole.

The second member is positioned with respect to the first member such that, when the first member is rotated about an axis with the threaded shank engaged with a threaded hole, the first member rotates with respect to the second member and transmits an axial force to the second member. The tube is positioned with respect to the second member such that the second member transmits the axial force to the tube.

The axial force urges the tube against a seat when the tube nut assembly is engaged with a corresponding coupling, and thereby establishes a sealed connection between a first passageway defined by the tube and a second passageway extending through the seat. The interface between the first and second members supports little or no torque transfer from the first member to the second member and the tube, and thus the tube experiences reduced torsional strain compared to the prior art. The reduced torsional strain contributes to an improved seal between the tube and the seat.

A corresponding fluid coupling system is also provided. The fluid coupling system includes a body defining a threaded hole. The body includes a terminal surface that defines a terminal end of the threaded hole, a seat that protrudes from the terminal surface, and a first fluid passage that extends through the seat.

The fluid coupling system further includes a tube nut having a first member and a second member. The first member has a threaded shank, and defines a first hole that extends through the threaded shank. The second member defines a second hole and is selectively rotatable with respect to the first member. A tube defines a second fluid passage and extends through the first hole and the second hole.

The threaded shank is engageable with the threaded hole. The second member is positioned with respect to the first member such that, when the first member is rotated about an axis during engagement of the threaded shank with the threaded hole, the first member rotates with respect to the second member and transmits an axial force to the second member. The tube is sufficiently positioned with respect to the second member such that the second member transmits the axial force to the tube.

A corresponding method is also provided. The method includes providing a body defining a threaded hole. The body has a terminal surface that defines a terminal end of the threaded hole, a seat that protrudes from the terminal surface and defines at least part of a first fluid passage. The method also includes providing a tube nut assembly having a first member, a second member, and a tube. The first member has a threaded shank, and defines a first hole that extends through the threaded shank. The second member defines a second hole and is selectively rotatable with respect to the first member. The tube defines a second fluid passage, and extends through the first hole and the second hole.

The method further includes inserting the shank into the threaded hole, and rotating the first member such that the first member rotates with respect to the second member and applies an axial load to the second member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
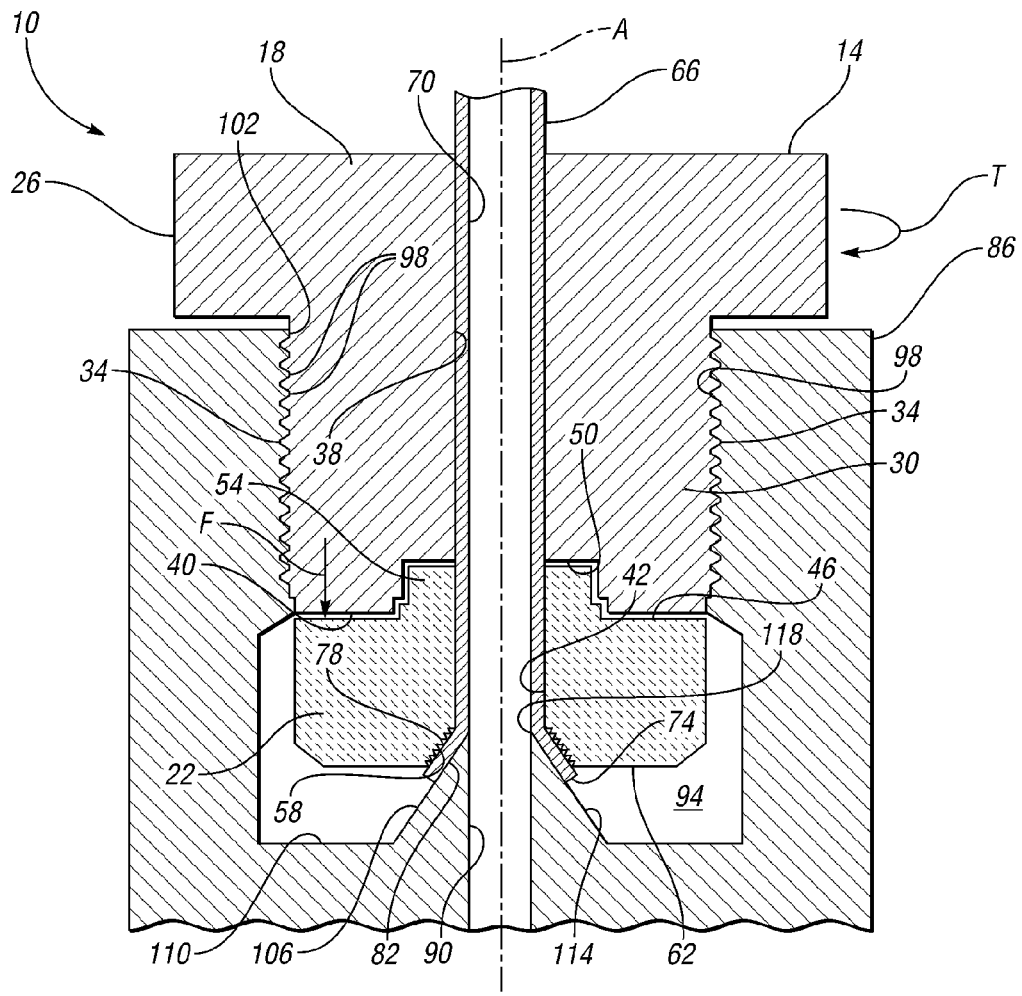
FIG. 1 is a schematic, cross-sectional side view of a tube nut assembly in accordance with the claimed invention.

Referring to FIG. 1, a fluid coupling system 10 includes a tube nut 14. The tube nut 14 includes a first member 18 and a second member 22. The first member 18 includes a polygonal (e.g., hexagonal) head 26. The first member 18 also includes a cylindrical shank 30. The shank 30 is threaded, i.e., the shank 30 has threads 34 on its outer surface. The first member 18 also defines a cylindrical hole 38 that extends through the polygonal head 26 and the threaded shank 30. In the embodiment depicted, the hole 38 and the shank 30 have a common centerline. The end of the first member 18 opposite the head 26 is formed by annular surface 40.

The second member 22 is generally cylindrical and defines a cylindrical hole 42 and an annular surface 46. The second member 22 is disposed with respect to the first member 18 such that the centerline of hole 42 is coextensive with the centerline of hole 38, and such that annular surface 46 is parallel to, and contacts, annular surface 40. The first member 18 is selectively rotatable with respect to the second member 22. During rotation of the first member 18 with respect to the second member 22, surface 40 slides along surface 46. Surfaces 40, 46 in the embodiment depicted are generally flat and are oriented perpendicularly to the centerlines of the holes 38, 42. Surfaces 40, 46 are characterized by a low roughness, and one or both of surfaces 40, 46 includes a lubricant or friction modifier coating, as understood by those skilled in the art, to reduce friction between surfaces 40, 46.

The first member 18 defines an annular concavity 50. Concavity 50 is disposed between the surface 40 and the opening of hole 38. The second member 22 defines an annular protuberance 54. The protuberance 54 is disposed between an opening of hole 42 and surface 46. The protuberance 54 extends into the concavity 50 to maintain radial alignment of the second member 22 with respect to the first member 18. Surfaces 40, 46, protuberance 54, and concavity 50 form the interface between members 18, 22 in the embodiment depicted. The second member 22 includes a frusto-conical surface 58 that defines a frusto-conical portion of hole 42. Surface 58 is positioned such that the opening of the hole 42 (formed in surface 62 of the second member 18) is flared. Surface 62 is parallel to surface 46.

A tube 66 extends through the holes 38 and 42. The tube defines a fluid passage 70 that extends from a frustoconical, flared portion 74 of the tube 66, adjacent surface 62 of the second member 22, through the head 26 of the first member 18. The tube 66 includes a frusto-conical surface 78, which defines the outer surface of the flared portion 74 of tube 66. The tube 66 also includes a frusto-conical surface 82, which defines the inner surface of the flared portion 74 of tube 66. More specifically, surface 82 defines a flared opening of the fluid passage 70.

In the embodiment depicted, the tube 66, including the flared portion 74, is metal and is formed from a single piece of material. However, and within the scope of the claimed invention, the tube 66 may be formed from multiple pieces comprising different materials. For example, the flared portion 74 may be metal and the remainder of the tube 66 may be plastic or elastomeric.

The fluid coupling system 10 also includes a body 86 that defines a fluid passage 90. The body also defines a generally cylindrical bore or hole 94. The hole 94 is threaded, i.e., the body 86 includes threads 98 along the surface of the hole 94. The hole 94 is characterized by an opening 102 through which the tube nut 14 is insertable for engagement between the threads 98 of the hole 94 and the threads 34 of the shank 30 of the first member 18.

The body 86 also includes a seat 106 and a terminal surface 110. The terminal surface 110 defines the terminal end of the hole 94. The seat 106 is frusto-conical and is protuberant from the terminal surface 110. The seat 106 includes a frusto-conical outer surface 114. The fluid passage 90 extends through the seat 106 to an opening 118 formed in the seat 106. The portion of the fluid passage 90 that extends through the seat 106 has a common centerline with the seat 106.

The fluid coupling system 10 is operative to provide sealed fluid communication between fluid passage 70 and fluid passage 90. To provide sealed communication between the fluid passages 70, 90, the tube nut 14 is inserted into the hole 94 of the body 86 through opening 102 so that the second member 22 is positioned between the first member 18 and the terminal surface 110 of the hole 94, and so that the threaded shank 30 engages the threaded hole 94, i.e., threads 34 engage threads 98. The centerlines of the holes 38, 42 and passages 70, 90 are coextensive, i.e., aligned with one another.

Torque T is applied to the polygonal head 26, which causes the first member 18 to rotate about axis A. In the embodiment depicted, axis A is coextensive with the centerlines of holes 38, 42 and passages 70, 90. As understood by those skilled in the art, interaction between threads 34 and threads 98 causes the rotation of the first member 18 to result in axial movement of the first member 18 toward the terminal surface 110. The axial movement of the first member 18 causes the first member 18 to exert an axial force F on the second member 22. More specifically, surface 40 exerts axial force F on surface 46, which urges the second member 22 toward the terminal surface 110. The low friction between surfaces 40 and 46 permits the rotation of the first member 18 with respect to the second member 22, such that little or no torque is transmitted from the first member 18 to the second member 22.

The tube 66 is sufficiently positioned with respect to the second member 22 such that the second member 22 transmits the axial force F to the tube 66. More specifically, in the embodiment depicted, surface 58 of the second member 22 transmits the axial force to surface 78 of the tube 66, urging surface 82 of the tube 66 into sealing engagement with surface 114 of the seat 106, and thereby establishing sealed fluid communication between passages 70, 90.

It should be noted that, in the embodiment depicted, the axial force F is transmitted directly from the first member 18 to the second member 22, and from the second member 22 to the tube 66. However, and within the scope of the claimed invention, the axial force F may be translated between the members 18, 22 and the tube 66 indirectly. For example, an intermediate member, such as a bearing (not shown) may be disposed between the first and second members 18, 22 and transmit the axial force F from the first member 18 to the second member 22 within the scope of the claimed invention.

Figure 2:
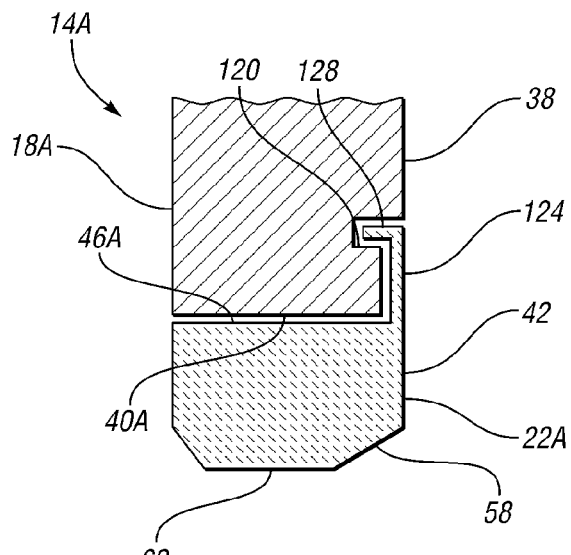
FIG. 2 is a schematic, cross-sectional side view of a portion of an alternative tube nut in accordance with the claimed invention.

Referring to FIG. 2, wherein like reference numbers refer to like components from FIG. 1, a portion of an alternative tube nut 14A is schematically depicted. The tube nut 14A is substantially identical to the tube nut shown at 14 in FIG. 1 except that the interface between the first member 18A and the second member 22A includes a retention feature that rotatably retains the second member 22A to the first member 18A independent of the body (shown at 86 in FIG. 1).

More specifically, the first member 18A defines an annular groove 120 that is open in the direction of hole 38. A leg 124 extends axially from surface 46A of the second member 22A. An annular flange 128 extends radially from the leg 124 into the groove 120. Interference between the flange 128 and the surfaces of the first member 18A that define the groove 120 prevents axial or radial movement of the second member 22A with respect to the first member 18A, while permitting rotation of the first member 18A with respect to the second member 22A. The groove 120 and the flange 128 thus cooperate to form the retention feature. Surface 40A of member 18A and surface 46A of member 22A have the same relationship and orientation as surfaces 40 and 46 in FIG. 1. At least one of surfaces 40A, 46A includes a lubricant or a friction modifier coating.

While the best modes for carrying out the invention have been described in detail, those familiar with the art to which this invention relates will recognize various alternative designs and embodiments for practicing the invention within the scope of the appended claims.

The invention claimed is:

1. A tube nut assembly that is matable with a body defining a threaded hole, the tube nut assembly comprising:
   a tube nut having a first member and a second member;
   the first member including a threaded shank, defining a first surface, and defining a first hole that extends through the threaded shank;
   the second member defining a second hole, defining a second surface opposing the first surface, and being selectively rotatable with respect to the first member about an axis that is perpendicular to the first and second surfaces;

a retention feature that rotatably retains the second member to the first member when the shank is not engaged with the threaded hole;

a tube extending through the first hole and the second hole;

wherein the threaded shank is engageable with the threaded hole;

wherein the second member is positioned with respect to the first member such that, when the first member is rotated about the axis during engagement of the threaded shank with the threaded hole, the first member rotates with respect to the second member and transmits an axial force to the second member;

wherein the tube is sufficiently positioned with respect to the second member such that the second member transmits the axial force to the tube;

wherein the second hole includes a frustoconical hole portion; and wherein the tube includes a frustoconical tube portion that is at least partially disposed within the frustoconical hole portion.

2. The tube nut assembly of claim 1, wherein at least one of the first and second surfaces includes a friction modifier coating.

3. A fluid connector system comprising:

a body defining a threaded hole, a terminal surface defining a terminal end of the threaded hole, a seat protruding from the terminal surface, and a first fluid passage extending through the seat;

a tube nut including a first member and a second member;

the first member including a threaded shank, defining a first surface, and defining a first hole that extends through the threaded shank;

the second member defining a second hole, defining a second surface opposing the first surface, and being selectively rotatable with respect to the first member about an axis that is perpendicular to the first and second surfaces;

a tube defining a second fluid passage, and extending through the first hole and the second hole;

a retention feature that rotatably retains the second member to the first member when the shank is not engaged with the threaded hole;

wherein the threaded shank is engageable with the threaded hole;

wherein the second member is positioned with respect to the first member such that, when the first member is rotated about the axis during engagement of the threaded shank with the threaded hole, the first member rotates with respect to the second member and transmits an axial force to the second member;

wherein the tube is sufficiently positioned with respect to the second member such that the second member transmits the axial force to the tube;

wherein the seat is positioned such that the axial force urges the tube against the seat such that the first and second fluid passages are in fluid communication with one another.

4. The fluid connector system of claim 3, wherein the tube is characterized by an inner surface; wherein the inner surface includes a frustoconical portion;

wherein the seat is characterized by a frustoconical outer surface; and wherein the axial force urges the frustoconical portion of the inner surface of the tube against the frustoconical outer surface of the seat.

5. The fluid connector system of claim 3, wherein at least one of the first and second surfaces includes a friction modifier coating.

\* \* \* \* \*